(12) United States Patent
Fischer et al.

(10) Patent No.: US 6,569,394 B2
(45) Date of Patent: May 27, 2003

(54) CATALYST BODY AND PROCESS FOR BREAKING DOWN NITROGEN OXIDES

(75) Inventors: Stefan Fischer, Nufringen (DE); Günther Pajonk, Zapfendorf (DE); Frank Witzel, Bloomfield Hills, MI (US)

(73) Assignee: Siemens Aktiengesellschaft, Munich (DE)

( * ) Notice: Subject to any disclaimer, the term of this patent is extended or adjusted under 35 U.S.C. 154(b) by 161 days.

(21) Appl. No.: 09/866,130

(22) Filed: May 25, 2001

(65) Prior Publication Data

US 2002/0004446 A1 Jan. 10, 2002

Related U.S. Application Data

(63) Continuation of application No. PCT/DE99/03615, filed on Nov. 12, 1999.

(30) Foreign Application Priority Data

Nov. 25, 1998 (DE) .......................................... 198 54 502

(51) Int. Cl.[7] .............................. F01N 3/10; B01J 29/06
(52) U.S. Cl. ............................... 423/239.2; 423/239.1; 502/64; 502/77; 502/71; 502/79; 502/350
(58) Field of Search ............................ 502/64, 71, 77, 502/79, 350; 423/239.1, 239.2

(56) References Cited

U.S. PATENT DOCUMENTS

| 3,617,487 A | * | 11/1971 | Jaffe ............................ 208/59 |
| 3,639,271 A | * | 2/1972 | Kittrell ........................ 502/70 |
| 3,928,233 A | * | 12/1975 | Young .......................... 502/74 |
| 3,951,864 A | * | 4/1976 | Meyer .......................... 502/66 |
| 4,495,061 A | * | 1/1985 | Mayer et al. ................. 208/89 |
| 4,663,300 A | * | 5/1987 | Lester et al. ................. 502/66 |
| 4,798,813 A | * | 1/1989 | Kato et al. ................... 502/60 |
| 5,071,805 A | * | 12/1991 | Winslow et al. .............. 502/66 |
| 5,271,913 A | | 12/1993 | Iida et al. |
| 5,417,949 A | | 5/1995 | McWilliams et al. |

FOREIGN PATENT DOCUMENTS

| EP | 0149966 A1 | 7/1985 |
| EP | 0219854 A2 | 4/1987 |
| EP | 0393917 A2 | 10/1990 |
| GB | 2193655 A | 2/1988 |
| JP | 5-123577 | 5/1993 |
| WO | WO 88/02659 | 4/1988 |

OTHER PUBLICATIONS

"Catalytic reduction of nitrous oxide with ammonia" (Stefan G.V.Bauer) Dissertation at Univ. of Karlsruhe, 1988, pp. 34–43, and pp. 92–96.

"Encyclopedia of Chemical Technology" (Kirk–Othmer), 3$^{rd}$. Edition, vol. 15, John Wiley & Sons, New York, 1981, pp. 640–669.

"Chemical Nomenclature and Formulation of Compositions of Synthetic and Natural Zeolites" (R.M. Barrer), Pure & Appl. Chem. vol. 51, 1979, pp. 1091–1100.

"Acidity of the Lewis–Centers in Zeolite Catalysts—NO as special molecule" (Frank O. Witzel), Fortschrittberichte VDI, Series 3: Verfahrenstechnik, No. 292, 1992.

* cited by examiner

*Primary Examiner*—Tom Dunn
*Assistant Examiner*—Christina Ildebrando
(74) *Attorney, Agent, or Firm*—Laurence A. Greenberg; Werner H. Stemer; Ralph E. Locher

(57) ABSTRACT

A gas stream that contains nitrogen oxides is passed, in the presence of a reducing agent, over a catalyst body with an active material that contains a zeolite and titanium dioxide. The zeolite is a hydrogen-ion-exchanged, acid zeolite. Even at temperatures above 450° C., the nitrogen oxides contained are still effectively converted into nitrogen and water.

7 Claims, 2 Drawing Sheets

CATALYST BODY AND PROCESS FOR BREAKING DOWN NITROGEN OXIDES

CROSS-REFERENCE TO RELATED APPLICATION

This application is a continuation of copending International Application No. PCT/DE99/03615, filed Nov. 12, 1999, which designated the United States.

BACKGROUND OF THE INVENTION

Field of the Invention

The invention relates to a catalyst body for breaking down nitrogen oxides in the presence of a reducing agent. The catalyst body has an active material that contains a zeolite and titanium dioxide. The invention also relates to a process for breaking down nitrogen oxides in a gas stream, a gas stream that contains nitrogen oxides being passed over the catalyst body. In particular, at the catalyst body the nitrogen oxides, with the aid of the reducing agent and in the presence of oxygen, are converted into molecular nitrogen and water using a selective catalytic reduction (SRC) process.

A catalyst body of the type described in the introduction is known from published British Patent Application GB 2 193 655 A. The active material of the catalyst body described in that document contains a titanium dioxide with a small specific surface area and a zeolite that is obtained by ion exchange and contains copper. The zeolite has a mean pore diameter of 10 Å or less and a molar ratio of silicon oxide to aluminum oxide of 10 or more. The catalyst body described has a high mechanical strength and a good resistance, in terms of its catalytic activity, to volatile catalyst poisons, such as arsenic, selenium or tellurium. Mordenite, ZSM-5 and ferrierite are described as preferred zeolites.

Furthermore, Published, European Patent Application EP 0 393 917 A2 discloses a catalyst body for breaking down nitrogen oxides, the active material of which contains a zeolite which, after ion exchange, contains copper and/or iron. The zeolite has a molar ratio of silicon oxide to aluminum oxide of at least 10 and a pore structure in which channels in all three spatial directions have a diameter of at least 7 Å. The catalyst body is supposed to be suitable for breaking down the nitrogen oxides in a temperature range from 250 to 600° C. USY (Ultra-Stabilized Y), Beta and ZSM-20 are described as preferred zeolites.

By contrast, conventional catalyst bodies with an active material which contains titanium dioxide and additions of vanadium oxide, tungsten oxide and/or molybdenum oxide are only suitable for breaking down nitrogen oxides up to a temperature of approximately 450° C. Since exhaust gases from a combustion installation, such as for example a fossil-fired power plant, a gas turbine or an internal-combustion engine, which contain nitrogen oxides regularly reach temperatures of up to 500° C. and above, the catalyst body described in Published, European Patent Application EP 0 393 917 A2 offers a considerable advantage.

U.S. Pat. No. 5,271,913 discloses a catalyst body for breaking down nitrogen oxides, the active material of which body contains a zeolite. The zeolite is in this case impregnated with cerium oxide or an iron oxide. The catalyst body is suitable for breaking down the nitrogen oxides using the selective catalytic reduction process in a temperature range from 500 to 700° C. Furthermore, the catalyst body described has a high stability with regard to sulfur components contained in the exhaust gas. A zeolite of the ZSM-5 type is described as a preferred zeolite, the molar ratio of silicon oxide to aluminum oxide being 20 or more.

SUMMARY OF THE INVENTION

It is accordingly an object of the invention to provide a catalyst body and a process for breaking down nitrogen oxides that overcome the above-mentioned disadvantages of the prior art devices and methods of this general type, which is still suitable for breaking down nitrogen oxides in the presence of a reducing agent even in a temperature range from 400 to 750° C. For this purpose, the catalyst body is to have both a sufficient mechanical stability and a sufficient catalytic stability. A further object of the invention is to describe a process for breaking down nitrogen oxides in a gas stream, with which it is possible to effectively lower the level of nitrogen oxides even at gas temperatures of between 400 and 750° C.

With the foregoing and other objects in view there is provided, in accordance with the invention, a catalyst body for breaking down nitrogen oxide in a presence of a reducing agent. The catalyst body contains an active material having a hydrogen-ion-exchanged, acid zeolite and an active component. The active material contains 40–60% by weight of the zeolite and 40–60% by weight of the active component. The active component contains 70–95% by weight of titanium dioxide, 2–30% by weight of tungsten trioxide, 0.1–10% by weight of aluminum oxide and 0.1–10% by weight of silicon dioxide.

The first object is achieved by a catalyst body having an active material that contains a zeolite and titanium dioxide, according to the invention, by the fact that the zeolite is a hydrogen-ion-exchanged, acid zeolite.

The term hydrogen-ion-exchanged, acid zeolite is understood as being a zeolite in which the exchangeable cations have been predominantly exchanged for hydrogen ions. This can take place, for example, by thermal conversion of ammonium ($NH_4^+$) ions which are contained in synthetic zeolites, by hydrogen ion exchange or by hydrolysis of a multiply charged cation-containing zeolite during a dehydration. In this context, reference is made in particular to Kirk-Othmer, "Encyclopedia of Chemical Technology", 3rd Edition, Volume 15, John Wiley & Sons, New York, 1981, pages 640 to 669.

Unlike in the prior art, it is not necessary, in the catalyst body according to the invention, for the zeolite of the active material to be a metal-cation-exchanged, i.e. for the exchangeable cations of the zeolite to be exchanged for metal cations, for example of copper or iron.

It should be noted that the term zeolite is understood as meaning a framework aluminosilicate in which the ratio of the oxygen atoms to the sum of the aluminum and silicon atoms is 2:1. As a result of some silicon atoms of oxidation state IV being exchanged for aluminum atoms of oxidation state III, the framework or the framework structure overall acquires a negative charge. The negative charge is compensated for by cations that are in the framework structure. The cations are what are known as exchangeable cations that can readily be replaced by other cations, in particular metal cations, by ion exchange.

A zeolite is also distinguished by the fact that the framework structure has continuous pores with a characteristic pore width.

Zeolites are classified on the basis of the molar ratio of silicon oxide to aluminum oxide or according to the characteristic framework structure resulting from the molar ratio. For classification purposes, reference is made to the article "Chemical Nomenclature and Formulation of Compositions of Synthetic and Natural Zeolites" by R. M. Barrer, Pure Appl. Chem. 51 (1979), pages 1091 to 1100.

An example of a natural zeolite is mordenite or a chabazite. Examples of synthetic zeolites are A, X and Y zeolites, which represent synthetic forms of mordenite, a ZSM-5 zeolite (ZSM-5 being a trademark for a synthetic zeolite produced by Mobil Oil Company Ltd.), an USY (Ultra-Stabilized Y) zeolite or a Beta zeolite. With regard to the structure of mordenite, of ZSM-5 zeolite and of Y zeolite, reference is also made to the specialist article titled "Acidität der Lewis-Zentren in Zeolith-Katalysatoren—NO als Sondenmolekül" ["Acidity of the Lewis Centers in Zeolite Catalysts—NO as Probe Molecule], by Frank O. Witzel, Fortschrittberichte VDI, Series 3: Verfahrenstechnik, No. 292, 1992.

Extensive tests have shown that a catalyst body with an active material which contains titanium dioxide and a hydrogen-ion-exchanged, acid zeolite is suitable for catalytic reduction of the nitrogen oxides using the SCR process up to temperatures of 750° C. This is because a catalyst body of this type on the one hand is catalytically active up to these high temperatures and on the other hand has the requisite temperature stability. In addition, the catalyst body has a high degree of stability with respect to moisture and a high resistance to sulfur-containing components in an exhaust gas that is to be treated.

The catalyst body opens up the possibility of reducing nitrogen oxides in exhaust gases from an internal-combustion engine or a gas turbine, it being possible for very high temperatures of the exhaust gas to occur without additional measures having to be taken in order to reduce the temperature so as to protect the catalyst body.

In a preferred embodiment, the active material of the catalyst body contains 40 to 60% by weight of zeolite. This composition provides a particularly good temperature stability and particularly low deactivation of the catalytic activity at high temperatures.

Furthermore, it is advantageous if the active material contains 40 to 60% by weight of an active component which contains, in each case based on the weight of the active component, 70 to 95% by weight of titanium dioxide, 2 to 30% by weight of tungsten trioxide, 0.1 to 10% by weight of aluminum oxide and 0.1 to 10% by weight of silicon dioxide. As a result, the catalyst body has a high catalytic activity with regard to the reduction of nitrogen oxides using the SCR process, i.e. for breaking down nitrogen oxides in the presence of a reducing agent.

It is particularly advantageous if the active component contains 8 to 12% by weight of tungsten trioxide.

Furthermore, it is advantageous if an USY zeolite, a Beta zeolite or a ZSM-5 zeolite is used as the zeolite. On account of its framework structure, a zeolite of this type is particularly suitable for the desired catalytic use.

For the catalytic activity, it is also advantageous if the active material has a BET surface area of 30 to 150 m$^2$/g and a pore volume, measured using the Hg penetration method, of 100 to 1000 ml/g.

After the hydrogen-ion-exchanged, acid zeolite has been prepared, the active material of the catalyst body can be produced, in a manner known per se, as follows. A starting material is produced, including the zeolite, by mixing, milling and/or kneading the individual components or their precursor compounds (for example water-soluble salts for the specified metal oxides) and if appropriate with the addition of conventional ceramic fillers and auxiliaries and/or glass fibers. The starting material is then either processed further to form unsupported extrudates or is applied as a coating to a ceramic or metallic support in honeycomb or plate form. The starting material is then dried at a temperature of 20 to 100° C. After the drying operation, the starting material is calcined to form the active material by calcination at temperatures of between 400 and 700° C.

In addition, after the calcining process, the calcined active material can be artificially aged by a final heat treatment at a temperature that is higher than the calcining temperature. A temperature which is approximately 50° C. above the subsequent maximum temperature of use of the catalyst body is selected for the artificial aging. The final heat treatment is carried out for a period of 20 to 80 hours.

In this way, the catalyst body acquires an improved temperature resistance.

The object relating to a process for breaking down nitrogen oxides in a gas stream is achieved, according to the invention, by the fact that a gas stream which contains nitrogen oxides is passed, in the presence of a reducing agent, over the described catalyst body, the nitrogen oxides being converted into nitrogen and water.

It is advantageous for the process and particularly cost-effective if ammonia or an aqueous urea solution is added to the gas stream as a reducing agent.

Advantageously, the gas stream is passed over the catalyst body at a temperature of 250 to 750° C. Within this specified temperature range, effective conversion of the nitrogen oxides into nitrogen and water takes place. There is no likelihood of the active material of the catalyst body being deactivated.

Other features which are considered as characteristic for the invention are set forth in the appended claims.

Although the invention is illustrated and described herein as embodied in a catalyst body and a process for breaking down nitrogen oxides, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
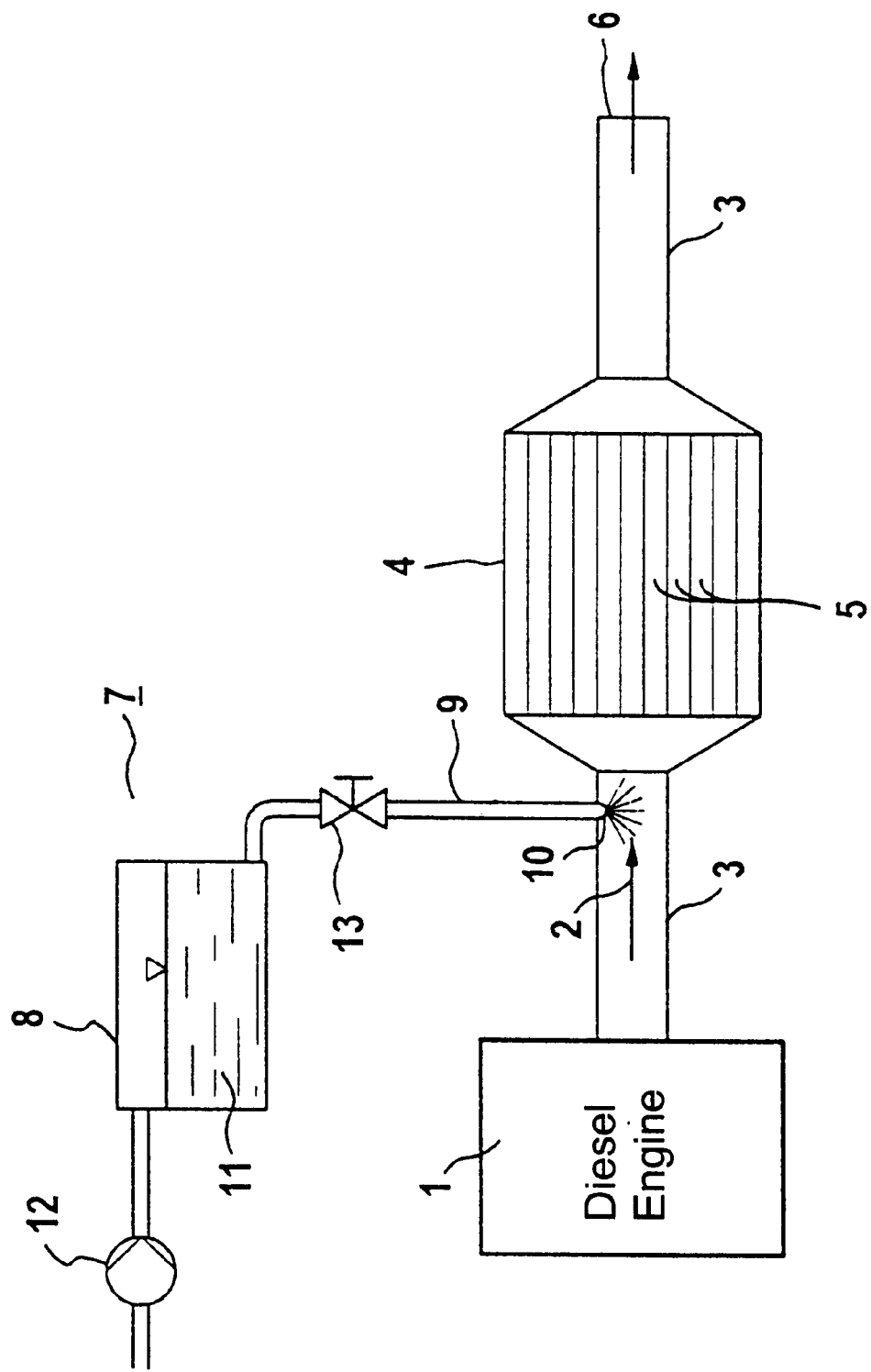
FIG. 1 is a diagrammatic illustration of a catalyst body in honeycomb form in an exhaust-gas cleaning system of a diesel engine according to the invention.

In all the figures of the drawing, sub-features and integral parts that correspond to one another bear the same reference symbol in each case. Referring now to the figures of the drawing in detail and first, particularly, to FIG. 1 thereof, there is shown an exhaust-gas cleaning system for the catalytic removal of nitrogen oxides from an exhaust gas from a diesel engine 1 (not shown in more detail) using a selective catalytic reduction (SCR) process. In the process, the exhaust gas from the diesel engine 1 flows as a gas stream 2 through an exhaust pipe 3 and a catalyst body 4 disposed in the exhaust pipe 3. The catalyst body 4 is a honeycomb body through which gas can flow and has a number of parallel channels 5 through which the exhaust gas 2 can flow. After it has flowed through the catalyst body 4, the gas stream 2, from which the nitrogen oxides have been removed, is released into the environment through an outlet 6.

The catalyst body 4 is produced as an unsupported extrudate from an active material. The active material in this case contains 50% by weight of ZSM-5 zeolite and 50% by weight of an active component that contains 90% by weight of titanium dioxide and 10% by weight of tungsten trioxide. Weight fractions of the customary fillers and auxiliaries are not included in the calculation.

The catalyst body 4 was produced by mixing a titanium dioxide/tungsten trioxide coprecipitate with an acid, hydrogen-ion-exchanged ZSM-5 zeolite. A zeolite of this type can be obtained as a so-called ZSM-5 zeolite in H form from Alsi-Penta. By adding water, a kneadable compound is produced from the mixture, and the compound is processed further by extrusion to form the honeycomb body. The honeycomb body is dried at 80° C. and finally is calcined at a temperature of 600° C.

To break down the nitrogen oxides using the SCR process, a device 7 for introducing a reducing agent is disposed at the exhaust pipe 3, upstream of the catalyst body 4 as seen in the direction of the flow. The introduction device 7 in this case contains a reducing-agent vessel 8 with a reducing-agent line 9 that is connected to the exhaust pipe 3. In the exhaust pipe 3, the reducing-agent line 9 opens into an injection nozzle 10. To introduce the reducing agent into the gas stream 2, an aqueous urea solution 11 is introduced into the exhaust pipe 3 according to demand by a compressor 12 and via a controllable valve 13. In the hot gas stream 2, the urea 11 is converted by pyrolysis and/or thermolysis into the reducing agent ammonia. Then, the nitrogen oxides contained in the gas stream 2 are converted into molecular nitrogen and water using the SCR process in the presence of ammonia.

In the text which follows, the high-temperature activity and high-temperature stability of the catalyst body according to the invention is demonstrated on the basis of exemplary embodiments.

EXAMPLE A

For production, a titanium dioxide/tungsten trioxide coprecipitate containing 90% by weight of titanium dioxide and 10% by weight of tungsten trioxide is mixed with a ZSM-5 zeolite of H-form with the addition of conventional ceramic fillers and auxiliaries. The mixture is milled and water is added to form a slip, i.e. a liquid ceramic compound. The slip is then applied as a coating, by a dipping operation, to a support that is in honeycomb form and contains cordierite (a magnesium aluminosilicate of composition $Mg_2Al_4Si_5O_{18}$ of rhombohedral structure). For an inflow area of 150×150 mm², the cordierite support has 1225 continuous channels. By drying at a temperature of 90° C. and subsequent calcining at a temperature of 600° C., the coated cordierite support is processed further to form the catalyst body 4 with the active material applied to it.

The quantitative proportions of the starting materials are selected in such a way that the active material of the finished catalyst body 4 has equal amounts of the active component, containing titanium dioxide and tungsten trioxide, and of the zeolite.

EXAMPLE B

A coated cordierite support is produced in the same way as in Example A, but in such a manner that the active material of the finished catalyst body 4 has a weight ratio of the active component, containing titanium dioxide and tungsten trioxide, to the zeolite of 75 to 25.

EXAMPLE C

As in Example A, a coated cordierite support is produced, but in such a manner that the active material of the finished catalyst body 4 has a weight ratio of the active component, containing titanium dioxide and tungsten trioxide, to the zeolite of 25 to 75.

EXAMPLE D

The coprecipitate of titanium dioxide and tungsten trioxide described in Example A is mixed with a ZSM-5 zeolite in H-form, with the addition of ceramic fillers and auxiliaries, the mixture is milled and water is added to form a kneadable plastic compound. The kneadable compound is then extruded to form the catalyst body 4 having a honeycomb form. The honeycomb catalyst body 4, which is produced as an unsupported extrudate, once again has 1225 parallel flow channels for an inflow area of 150×150 mm². The catalyst body 4 is dried at 90° C. and is then calcined at 600° C. As a result of this final process, the catalyst body acquires its catalytic activity.

EXAMPLE E

The catalyst body 4 in honeycomb form, which is produced as an unsupported extrudate as described in Example D, is exposed to a constant temperature load of 700° C. for 500 hours.

Test

A model exhaust gas is passed over the catalyst body 4 described in Examples A to E, at a space velocity of 15,500/h. The model exhaust gas is nitrogen and contains 200 ppm of nitrogen monoxide NO, 200 ppm of ammonia $NH_3$ as the reducing agent, 11% by volume of oxygen $O_2$ and 10% by volume of water $H_2O$.

At the model exhaust gas temperatures of 450° C., 500° C., 540° C., 570° C., 600° C., 650° C. and 750° C., the catalytic conversion of the nitrogen monoxide NO into molecular nitrogen $N_2$ is successively measured on the catalyst body 4. For this purpose, the level of nitrogen monoxide NO is measured upstream and downstream of the catalyst body 4, and the level of nitrogen $N_2$ is measured downstream of the catalyst body 4, in the model exhaust gas.

Figure 2:
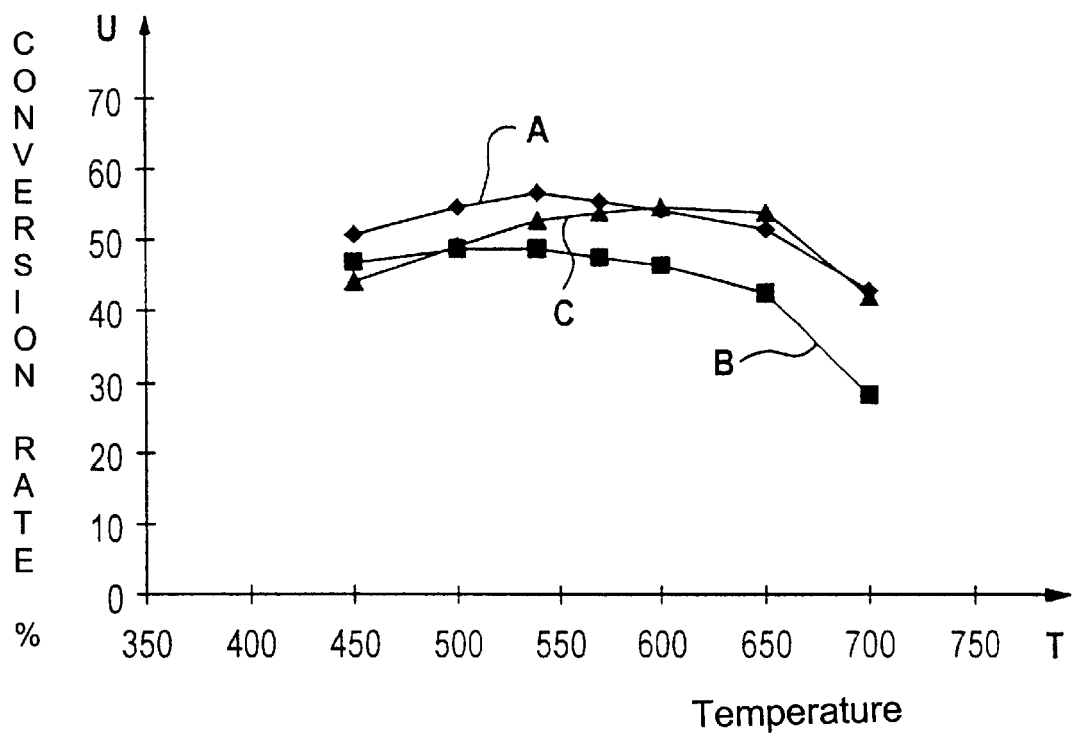
FIG. 2 is a graph illustrating a profile of a conversion of NO into $N_2$ as a function of the temperature of the exhaust-gas stream for catalyst bodies of various compositions.
Figure 3:
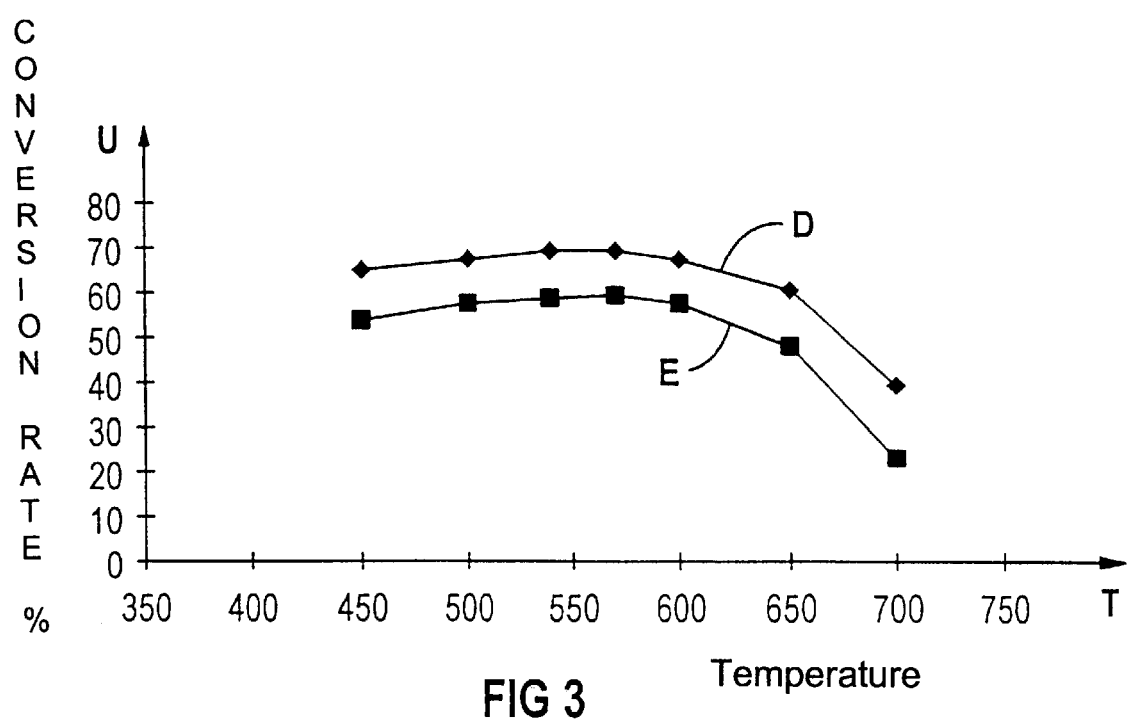
FIG. 3 is a graph illustrating the profile of the conversion of NO into $N_2$ as a function of the temperature of the exhaust-gas stream for a new catalyst body and a catalyst body which has been exposed to a temperature load.

The measurement results are compiled in FIGS. 2 and 3.

FIG. 2 shows the measured dependency of the $NO/N_2$ conversion in percent on the temperature of the model exhaust gas for the catalyst bodies 4 described in Examples A, B and C.

FIG. 3 shows the dependency of the measured $NO/N_2$ conversion in percent on the temperature for the catalyst bodies described in Example D and E.

As can be seen from FIG. 2, the catalyst bodies described in Examples A, B and C achieve a catalytic conversion of between 40 and 60% in the high-temperature range between 450 and 650° C. Therefore, between 40 and 60% of the NO contained in the model exhaust gas was converted into $N_2$. The catalyst body described in Example A achieves a catalytic conversion of 50% and above over the entire temperature range from 450 to 650° C. The conversion measured using the catalyst body 4 described in Example C even rises at higher temperatures.

The catalytic activity of the catalyst bodies 4 only drops at temperatures of over 650° C. However, even at a temperature of 700° C. the catalysts 4 described in Examples A and C still achieve a conversion of approximately 43%.

This result clearly demonstrates the suitability of the catalyst bodies 4 described in Examples A to C for breaking down nitrogen oxides using the SCR process in the high-temperature range from 450 to over 700° C. By contrast, beyond a temperature of 450° C., a similar catalyst body 4 with an active material based on titanium dioxide with additions of tungsten trioxide and/or vanadium pentoxide achieves only a negligible conversion of nitrogen oxides using the SCR process.

The temperature resistance of the catalyst bodies 4 becomes clear from FIG. 3. As stated above, the model exhaust gas described is also passed over the catalyst bodies described in Examples D and E. For the temperatures 450° C., 500° C., 540° C., 570° C., 600° C., 650° C. and 700° C., the catalytic conversion of nitrogen monoxide NO into molecular nitrogen $N_2$ is in each case determined successively. The measured $NO/N_2$ conversion in percent as a function of the temperature is plotted in FIG. 3 as the result. FIG. 3 clearly shows that the catalyst body 4 as described in Example E, which was exposed to a high temperature load, has only lost approximately 10% of its high catalytic activity even after the loading.

We claim:

1. A catalyst body for breaking down nitrogen oxide in a presence of a reducing agent, the catalyst body comprising:
   an active material containing a hydrogen-ion-exchanged, acid zeolite and an active component, said active material contains 40–60% by weight of said zeolite and 40–60% by weight of said active component, said active component contains 70–95% by weight of titanium dioxide, 2–30% by weight of tungsten trioxide, 0.1–10% by weight of aluminum oxide and 0.1–10% by weight of silicon dioxide.

2. The catalyst body according to claim 1, wherein said active component contains 8–12% by weight of the tungsten trioxide.

3. The catalyst body according to claim 1, wherein said zeolite is selected from the group consisting of an USY zeolite, a Beta zeolite and a ZSM-5 zeolite.

4. The catalyst body according to claim 1, wherein said active material has a BET surface area of 30–150 $m^2/g$ and a pore volume, measured using a Hg penetration method, of 100–1000 ml/g.

5. A process for breaking down nitrogen oxides, which comprises the steps of:
   providing a catalyst body containing an active material having a hydrogen-ion-exchanged, acid zeolite and an active component, the active material contains 40–60% by weight of the zeolite and 40–60% by weight of the active component, the active component contains 70–95% by weight of titanium dioxide, 2–30% by weight of tungsten trioxide, 0.1–10% by weight of aluminum oxide and 0.1–10% by weight of silicon dioxide; and
   passing a gas stream containing the nitrogen oxides, in a presence of a reducing agent, through the catalyst body, and converting the nitrogen oxides into nitrogen and water.

6. The process according to claim 5, which comprises adding an aqueous urea solution to the gas stream as the reducing agent.

7. The process according to claim 5, which comprises passing the gas stream through the catalyst body at a temperature of 250–750° C.

* * * * *